United States Patent
Lakshmeshwar et al.

(10) Patent No.: US 8,522,025 B2
(45) Date of Patent: Aug. 27, 2013

(54) AUTHENTICATING AN APPLICATION

(75) Inventors: Shreekanth Lakshmeshwar, Karnataka (IN); Philip Ginzboorg, Espoo (FI); Pekka Laitinen, Helsinki (FI); Silke Holtmanns, Klaukkala (FI)

(73) Assignee: Nokia Corporation, Espoo (FI)

( * ) Notice: Subject to any disclaimer, the term of this patent is extended or adjusted under 35 U.S.C. 154(b) by 1911 days.

(21) Appl. No.: 11/582,380

(22) Filed: Oct. 18, 2006

(65) Prior Publication Data

US 2007/0234041 A1    Oct. 4, 2007

Related U.S. Application Data

(60) Provisional application No. 60/786,357, filed on Mar. 28, 2006.

(51) Int. Cl.
*H04L 9/32* (2006.01)

(52) U.S. Cl.
USPC ........................................................... 713/170

(58) Field of Classification Search
USPC ................. 713/1–2, 168–174, 182–186, 202; 709/229
See application file for complete search history.

(56) References Cited

U.S. PATENT DOCUMENTS

| | | | |
|---|---|---|---|
| 2005/0097330 A1* | 5/2005 | Lundblade | 713/176 |
| 2005/0135622 A1* | 6/2005 | Fors et al. | 380/268 |
| 2005/0246548 A1* | 11/2005 | Laitinen | 713/182 |
| 2006/0020791 A1* | 1/2006 | Laitinen | 713/168 |
| 2006/0174117 A1* | 8/2006 | Laitinen | 713/169 |
| 2006/0196931 A1* | 9/2006 | Holtmanns et al. | 235/380 |
| 2006/0205388 A1* | 9/2006 | Semple et al. | 455/411 |
| 2006/0206710 A1* | 9/2006 | Gehrmann | 713/168 |
| 2006/0218396 A1 | 9/2006 | Laitinen et al. | 713/167 |
| 2006/0251257 A1* | 11/2006 | Haverinen et al. | 380/270 |
| 2006/0253424 A1* | 11/2006 | Huang | 707/2 |
| 2006/0271785 A1* | 11/2006 | Holtmanns et al. | 713/171 |
| 2006/0280305 A1* | 12/2006 | Bajko et al. | 380/270 |
| 2006/0282882 A1* | 12/2006 | Bajko et al. | 726/4 |
| 2007/0042754 A1* | 2/2007 | Bajikar et al. | 455/411 |
| 2007/0086590 A1* | 4/2007 | Blom | 380/278 |
| 2008/0160959 A1* | 7/2008 | Huang et al. | 455/411 |
| 2008/0215888 A1* | 9/2008 | Barriga et al. | 713/176 |

FOREIGN PATENT DOCUMENTS

CA    2 545 159 A1    6/2005

OTHER PUBLICATIONS

3GPP TS 33.220 V7.2.0 (Dec. 2005); 3$^{rd}$ Generation Partnership Project; Technical Specification Group Services and System Aspects; Generic Authentication Architecture (GAA); Generic bootstrapping architecture (Release &).

3GPP TS 33.220 V7.3.0 (Mar. 2006), Generic Authentication Architecture (GAA); Generic Bootstrrapping Architecture (Release 7).

(Continued)

*Primary Examiner* — Eleni Shiferaw
*Assistant Examiner* — Jing Sims
(74) *Attorney, Agent, or Firm* — Harrington & Smith

(57) ABSTRACT

One aspect of the invention discloses a method of authenticating an application. The method comprising performing, with a server application, bootstrapping procedures between the server application and a bootstrapping server function; deriving a shared key based on at least a key received from the bootstrapping server function server during the bootstrapping procedures and a network application function identifier; providing an application with a bootstrapping transaction identifier, the bootstrapping transaction identifier being received from the bootstrapping server function server during the bootstrapping procedures; receiving a response from the application; and authenticating the application by validating the response with the shared key.

47 Claims, 5 Drawing Sheets

(56) References Cited

OTHER PUBLICATIONS

GEMPLUS IT AL: "GAA-based terminal to UICC key establishment", 3GPP DRAFT' S3 050378_Terminal_UICC_Key_Establishment, 3rd Generation Partnership Project (3GPP), Mobile Competence Centre; 650, Route Des Lucioles; F-06921 Sophia-Antipolis Cedex France, vol. SA WG3, No. Montreal; Jun. 21, 2005 (4 pages).

Huawei:"GAA based Peripheral Equipment to UICC key establishment", 3GPP DRAFT; S3-060015_GAA Based Peripheral Equipment to UE Key Establishment, $3^{rd}$ Generation Partnership Project(3GPP), Mobile Competence Centre ; 650, Route Des Luciolesi; F-06921 Sophia-Antipolis Cedex ; France\ vol. SA WG3, No. Bangalore; Jan. 31, 2006 (8 pages).

\* cited by examiner

AUTHENTICATING AN APPLICATION

CROSS-REFERENCE TO RELATED APPLICATIONS

This application claims priority of U.S. Provisional Patent Application No. 60/786,357, filed on Mar. 28, 2006. The subject matter of this earlier filed application is hereby incorporated by reference.

BACKGROUND OF THE INVENTION

1. Field of the Invention

The present invention relates to authentication. In particular, the present invention relates to novel and improved methods, computer programs and mobile terminal for authenticating a client application.

2. Description of the Related Art

The current development towards truly mobile computing and networking has brought on the evolution of various access technologies, which also provide the users with access to the Internet when they are outside their own home network. So far, the use of the Internet has been dominated by person-to-machine communications, i.e. information services. The evolution towards the so-called third generation (3G) wireless networks brings along mobile multimedia communications, which will also change the way IP-based services are utilized in public mobile networks. The IP Multimedia Subsystem (IMS), as specified by the by the $3^{rd}$ Generation Partnership Project (3GPP), integrates mobile voice communications with Internet technologies, allowing IP-based multimedia services to be utilized in mobile networks.

The new multimedia capable mobile terminals (multimedia phones) provide an open development platform for application developers, allowing independent application developers to design new services and applications for the multimedia environment. The users may, in turn, download the new applications/services to their mobile terminals and use them therein.

For example, technical specification 3GPP TS 33.220 discloses the Generic Bootstrapping Architecture (GBA) that is part of the Generic Authentication Architecture (GAA). A general network model of the GBA is disclosed in FIG. 1. The model disclosed in FIG. 1 includes four different entities: User Equipment (UE) 14, a Bootstrapping Server Function (BSF) 12, a Network Application Function (NAF) 16 and a Home Subscriber System (HSS) 10. FIG. 1 also discloses the interfaces between the entities.

FIG. 2 is a diagram that illustrates the bootstrapping procedure in the GBA. When UE 200 wants to interact with a NAF, and it knows that the bootstrapping procedure is needed, it shall first perform a bootstrapping authentication. When the bootstrapping is initiated, UE 200 sends (21) an HTTP request towards BSF 202. BSF 202 retrieves (22) the complete set of GBA user security settings and one Authentication Vector (AV, AV=RAND∥AUTN∥XRES∥CK∥IK) over the reference point Zh from a HSS 204. Then BSF 202 forwards the RAND and AUTN to UE 200 in the 401 message (23) (without the CK, IK and XRES). This is to demand UE 200 to authenticate itself. UE 200 checks (24) AUTN to verify that the challenge is from an authorized network. UE 200 also calculates CK, IK and RES. This will result in session keys IK and CK in both BSF 202 and UE 200. UE 200 sends (25) another HTTP request, containing the Digest AKA response (calculated using RES), to BSF 202. BSF 202 authenticates (26) UE 200 by verifying the Digest AKA response and generates (27) a master key Ks by concatenating CK and IK. A B-TID value shall be also generated. BSF 202 sends (28) a 200 OK message, including the B-TID, to UE 200 to indicate the success of the authentication. In addition, in the 200 OK message, BSF 202 shall supply the lifetime of the key Ks. The key Ks is generated in UE 200 by concatenating CK and IK. Both UE 200 and BSF 202 shall use the Ks to derive the key Ks_NAF. Ks_NAF shall be used for securing the reference point Ua (see FIG. 1).

Ks_NAF is computed as Ks_NAF=KDF (Ks, key derivation parameters), where KDF is a suitable key derivation function, and the key derivation parameters comprise the user's private identity, the NAF_Id and RAND. KDF for the GBA is defined in 3GPP TS 33.220, Annex B. The NAF_Id consists of the full DNS name of the NAF and Ua protocol security identifier. KDF shall be implemented in the mobile equipment.

When an application in the terminal wants to authenticate to a network application server, it obtains a NAF specific shared secret Ks_NAF through an API offered by a trusted application in the terminal. The trusted application uses the above described bootstrapping procedures with the Bootstrapping Server Function (BSF) server in the network to derive the NAF specific shared secret Ks_NAF. The NAF gets the shared secret for this client application by communicating with the BSF.

A service provider may want to prevent client applications developed and owned by other service providers and installed in a mobile terminal to access his service. To achieve this goal he could, for instance, authenticate an application in the mobile terminal every time it tries to access the service. This method, however, would require a long-term security association between the service provider and each deployed copy of the application. Maintaining those long-term security associations may add significantly to the costs of the service provider.

Since the NAF specific key, i.e. Ks_NAF, is indeed NAF (i.e. service) specific, the goal may be achieved by the mobile terminal by restricting access to Ks_NAF to only those applications that are trusted by the NAF service provider. This restriction is possible if the mobile terminal platform hardware and software has the following security properties: (1) processes can authenticate each other and (2) one process cannot access the data of another process. The mobile terminal, however, has to be configured; it needs to know which applications are allowed access to what NAF specific credentials (i.e., NAF specific keys).

There are at least two options to configure access permissions to GBA credentials (i.e., a set of NAF specific keys) in the mobile terminal.

First, the mobile terminal may get the configuration data with permissions for all NAF applications from an external source. In this case it is required that the configuration data comes from a trusted source and is integrity protected. The permissions to access GBA credentials could be delivered to the ME together with other configuration data using a device management framework (e.g., OMA Device Management procedures), that implements those requirements. The security of configuration data could be based on 1) symmetric, or on 2) asymmetric cryptography. This option can be used also without an external device management framework. For example, the mobile terminal may be configured before it is delivered to the end user, e.g. in the factory by the manufacturer, or in the shop by the seller of the mobile terminal. After the mobile terminal has reached its end user, permissions could be modified manually: e.g., the mobile terminal will ask its owner to configure each new permission. However, manual configuration of the mobile terminal may impair the usability of service usage, so it is better to configure the permissions automatically as much as possible. Furthermore, a potential disadvantage of this option is that the source of configuration data must be trusted by all service providers because it defines the permissions for all NAF applications.

Second, the access rights for each application can be configured in the terminal one by one based on communication with external source.

Another method to configure the access rights individually for each application is to use the Public Key Infrastructure (PKI) and signed applications. Typically, the signature of a signed application can be verified using an application specific digital certificate. It may be that the PKI system used to certify and verify applications includes a possibility to define the service, or services, this application is allowed to access (i.e., to which NAF specific credentials the application has access rights to). This information may be encoded in the application certificate itself, or be part of the metadata of the application. Typically, this information would consist of NAF identifiers that identify each NAF specific credential uniquely.

The security of configuration with GBA symmetric keys is based on the fact that the NAF and the mobile terminal share the key Ks_NAF. Two main methods to implement this alternative are: (1) If an application signed by Ks_NAF, then it can be trusted to get access to future instances of that NAF's credentials, and (2) if an application can prove once to the mobile terminal that it knows Ks_NAF, then it can be trusted to get access to future instances of that NAF's credentials.

When client applications are installed on a mobile terminal, there is a need to establish a trust between this application and a GAA_ME server (i.e., the trusted application that performs the bootstrapping procedure with the BSF) installed in the mobile terminal if this application wants to get NAF specific keys to be acquired from the GAA_ME server. However, there is way to sign the application using a NAF specific digital certificate and to use the signature to establish trust the application in the terminal. For example this is being used in Symbian terminals. However, GAA_ME server would not know whether out of all the installed applications (trusted), which only are should be provided with NAF specific keys.

The aforementioned problem can be solved by adding some entry to a certificate telling that this application signed by the application should be provided with GAA client capability (i.e. NAF credentials can be acquired from GAA_ME server to a mobile terminal application). This solution needs some mechanism between the GAA_ME server and the platform (with platform security) to coordinate the trust. When the client applications are in the proximity device like a laptop (split-terminal use case), which wants to use the phone's GAA_ME server, this solution becomes tricky to implement.

Based on the above there are several problems in prior art solutions that need to be solved. For example, which applications in a mobile terminal are allowed access to what NAF credentials and how to configure this. Furthermore, another problem is how to authenticate an application to a GAA_ME server in a mobile terminal.

SUMMARY OF THE INVENTION

According to one aspect of the invention, there is provided a method of authenticating an application. The method comprises performing, with a trusted server application, bootstrapping procedures between the trusted server application and a bootstrapping server function; deriving a shared key based on at least a key agreed on with the bootstrapping server function server during the bootstrapping procedures and a network application function identifier; providing an application with a bootstrapping transaction identifier, the bootstrapping transaction identifier being received from the bootstrapping server function server during the bootstrapping procedures; receiving a response from the application; and authenticating the application by validating the response with the shared key.

According to another aspect of the invention, there is provided a method of authenticating an application with a trusted server application. The method comprises receiving, with an application, from a trusted server application at least a bootstrapping transaction identifier; opening a communication link with a network application function server; providing the network application function server with at least the bootstrapping transaction identifier via the communication link; receiving, in response to providing the bootstrapping transaction identifier, at least a response from the network application function server; and authenticating the application by providing the trusted server application with at least the response received from the network application function server.

According to another aspect of the invention, there is provided a method of deriving an authentication key. The method comprises opening a communication link with an application; receiving, from the application, at least a bootstrapping transaction identifier via the communication link; sending a request to a bootstrapping server function server to receive a shared key, the request comprising at least the bootstrapping transaction identifier; receiving, from the bootstrapping transaction identifier, the shared key in response to the request; deriving a response by using at least the shared key; and sending at least the response to the application.

Each of the aforementioned aspects may be implemented as a computer program that may be embodied on a computer-readable medium.

According to another aspect of the invention, there is provided a mobile terminal for authenticating an application. The mobile terminal comprises a trusted server application configured to perform bootstrapping procedures between the trusted server application and a bootstrapping server function; to derive a shared key based on at least a key material received from the bootstrapping server function server during the bootstrapping procedures and a network application function identifier; to provide an application with a bootstrapping transaction identifier, the bootstrapping transaction identifier being received from the bootstrapping server function server during the bootstrapping procedures; to receive a response from the application; and authenticate the application by validating the response with the shared key.

The present invention has several advantages over the prior-art solutions. No virus applications or even any third party applications can request for GAA credentials from the GAA_ME server installed in mobile equipment unless they can authenticate to some NAF and derive a shared secret (i.e. KS_NAF_install) to be used for registration to the GAA_ME server.

Furthermore, the invention provides a solution to derive a shared secret between a GAA_ME server and an application on a proximity terminal. The solution disclosed in the invention may be used for authenticating the proximity application towards the GAA_ME server. However, this may require that there is some kind of trusted computing (platform security) in the proximity device as well.

Moreover, the invention provides the operators an attractive option to distribute their applications. Operators who already have username-password based authentication (or some other authentication mechanism) already, the solution disclosed in the invention makes it easier to move towards the GAA based credential usage.

Furthermore, the invention can also be used so that two devices generate a group shared key that is then used for a group communication and might be distributed further to other users e.g. to be used to set up secure tunnels between them and to exchange certificates to set up Virtual Private Networks (VPN) between them or just to set up Transport Layer Security (TLS) between them.

In general, the solution disclosed in the invention may be used for installation of operator specific applications and building some trust between an existing component and the newly installed component.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the present invention, examples of which are illustrated in the accompanying drawings.

Figure 1:
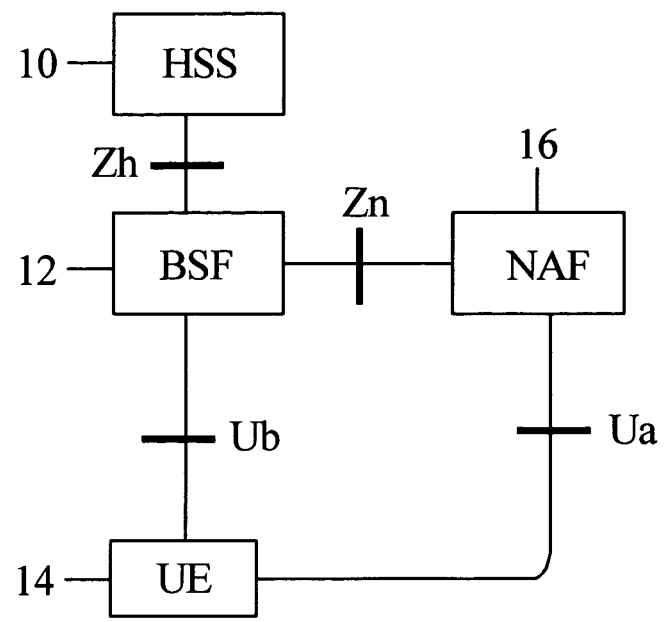
FIG. 1 is a block diagram illustrating a prior art architecture of the Generic Bootstrapping Architecture (GBA)
Figure 2:
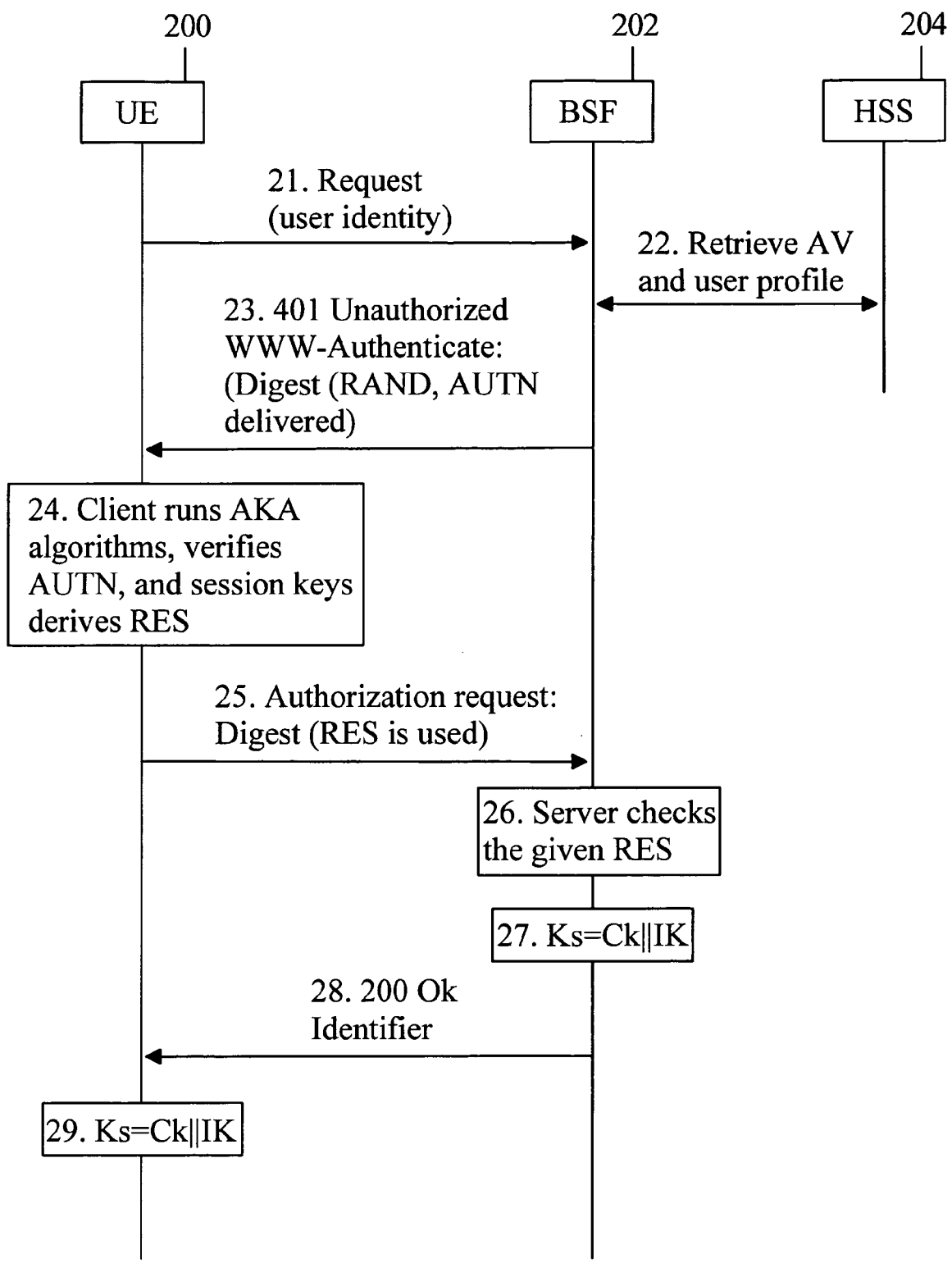
FIG. 2 is a signaling diagram illustrating a prior art bootstrapping procedure.
Figure 3:
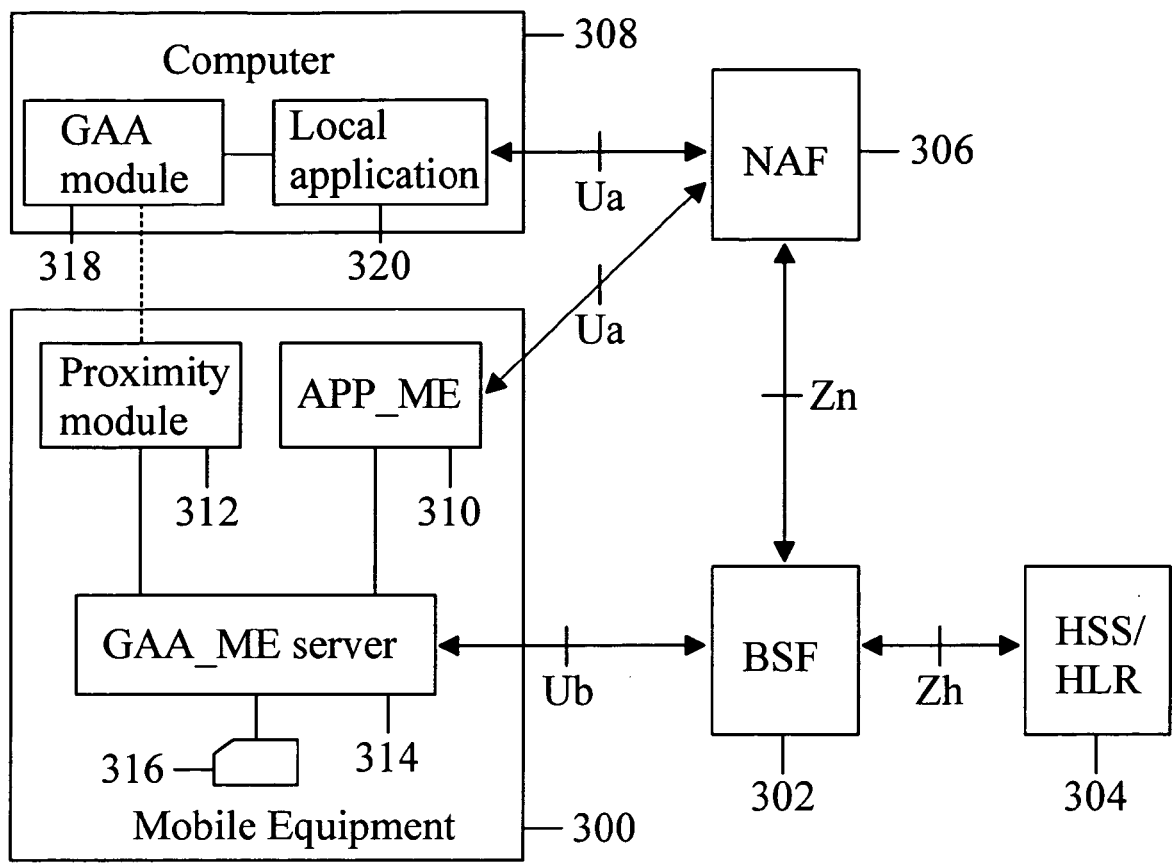
FIG. 3 is a block diagram illustrating various elements in accordance with one embodiment of the invention.

FIG. 3 discloses a block diagram that illustrates various elements that may take part in the solution disclosed in the invention at hand. FIG. 3 discloses five different entities: Mobile Equipment (ME) 300, a Bootstrapping Server Function (BSF) 302, a Network Application Function (NAF) 306, a Home Subscriber System (HSS) 304 and a computer 308. The block diagram of FIG. 3 takes into also account a split-terminal situation. In a split-terminal situation a local application 320 resides e.g. in the computer 308. The local application is connected to a GAA_ME server of mobile equipment 314 via a GAA module 318 and a proximity module 312. The actual connection between mobile equipment 314 and the computer 308 is accomplished e.g. via a proximity link, e.g. Bluetooth. APP_ME 310 is a (client) application that is installed in mobile equipment 300. In other words, the application may be installed either in mobile equipment itself or in a computer 308 that has a local connection to mobile equipment 300.

The GAA architecture provides a way to generate a shared secret between mobile equipment 300 and the NAF 306. This secret is used whenever mobile equipment 300 wants to authenticate to the NAF 306. The applications in mobile equipment 300 need USIM (or ISIM or SIM) credentials to carry out GAA bootstrapping to generate NAF specific keys. The capability to acquire USIM credentials from the USIM should not preferably be made available to all the applications in mobile equipment 300 because of a security threat. Hence, a trusted GAA_ME server 314 may be installed in mobile equipment 300 during production or later, which has the capability to acquire USIM credentials from the USIM and hence the capability to do the bootstrapping to generate NAF credentials. Then, a client application (APP_ME) would use the services of the GAA_ME server 314 to get the NAF specific credentials. Such GAA_ME client application is prepared and packaged by the NAF provider. Such application is signed using a digital signature which platform (symbian, xp, Linux, java etc.) understands. After the installation such application registers to the GAA_ME 314 server during its first time run.

Mobile equipment 300 and the network application function 306 may include a memory or memories (not disclosed in FIG. 3) that may also include a computer program (or portion thereof), which when executed on a data processing unit performs at least some of the steps of the invention. The data processing unit may also include memory or a memory may be associated therewith which may include the computer program (or portion thereof) which when executed on the data processing unit performs at least some of the steps of the invention.

Figure 4:
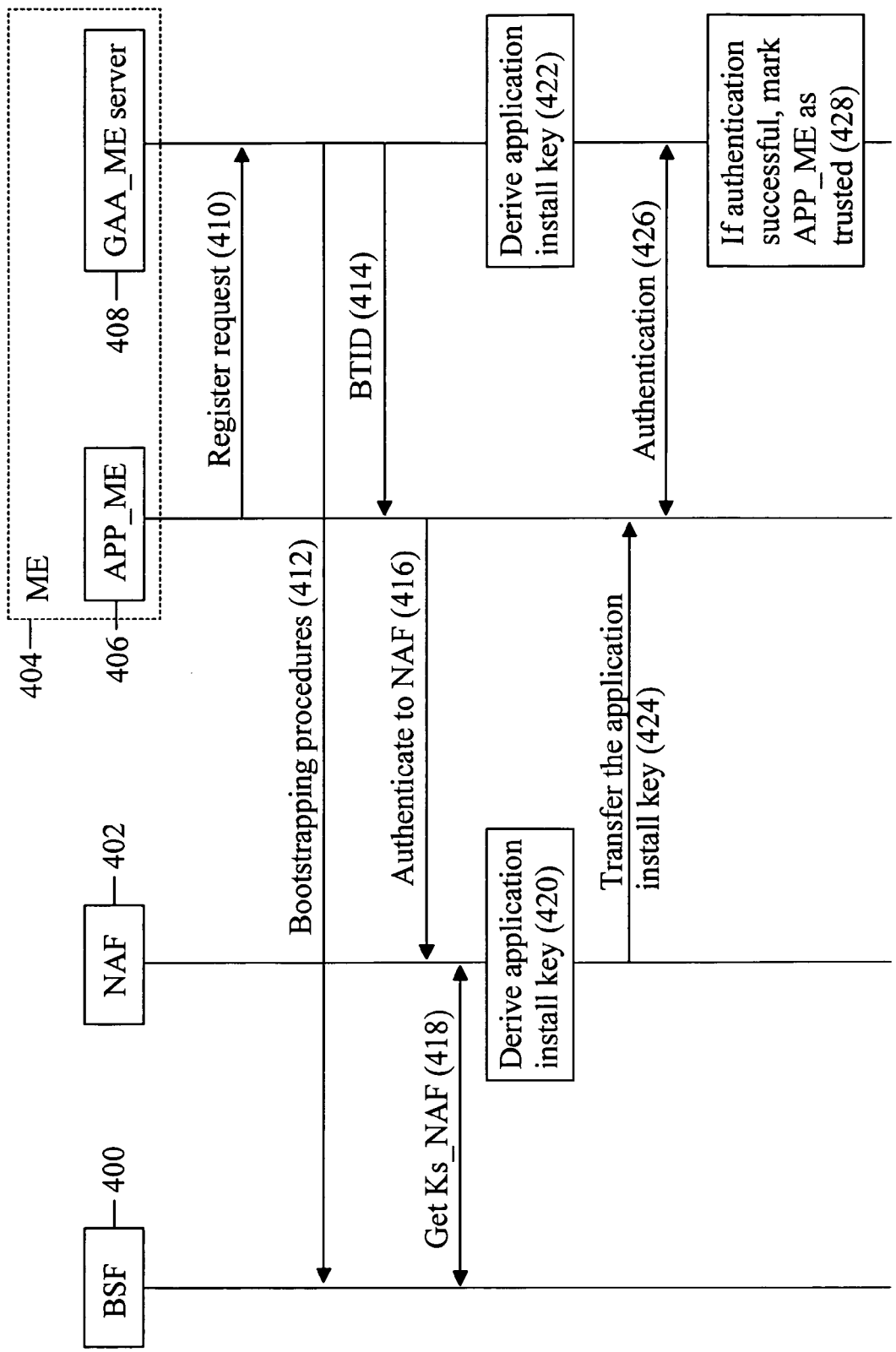
FIG. 4 is a signaling diagram illustrating one embodiment for authenticating an application towards a server application in mobile equipment in accordance with the present invention.

FIG. 4 is a signaling diagram illustrating one embodiment for registering and authenticating an application to a server application in mobile equipment in accordance with the present invention. FIG. 4 discloses three different entities: a Bootstrapping Server Function (BSF) server 400, a Network Application Function (NAF) server 402 and Mobile Equipment (ME) 404. Mobile equipment 404 includes a client application APP_ME 406 and a server application GAA_ME 408 already disclosed in FIG. 3. In another embodiment, the client application APP_ME may reside outside mobile equipment 404, that is, e.g. in an external device connected to mobile equipment 404.

In the embodiment of FIG. 4, the APP_ME 406 sends a registration request (410) to the GAA_ME server 408. The request indicates to the GAA_ME server 408 that the APP_ME wants to authenticate itself to the GAA_ME 408 server. The request may also contain a NAF identifier and/or an application instance identifier. The application provider may have hard-coded the application or in it is some way configured to have the NAF identifier and the application instance identifier in place.

The GAA_ME server 408 carries out (412) a 3GPP bootstrapping protocol with the BSF 400. The bootstrapping protocol is disclosed in more detail e.g. in 3GPP technical specification 3GPP TS 33.220 V7.2.0 (2005-12). During the bootstrapping the GAA_ME server 408 receives at least a BTID (Bootstrapping Transaction Identifier) and the key lifetime from the BSF 400 and passes (414) at least the BTID back to the APP_ME 406. Since the GAA_ME server 408 is able to derive material Ks and knows the NAF identifier, it is able to derive the key Ks_NAF which is a shared secret between the GAA_ME server 408 and the NAF 402. The GAA_ME server 408 will then derive (422) an install key KS_NAF_install using KS_NAF and optionally the application instance identifier mentioned earlier using any appropriate method.

After receiving the BTID from the GAA_ME server 408, the APP_ME 406 opens a communication link with the NAF 402. The communication link may be secured to mitigate possible man-in-the-middle attacks by using e.g. the Secure Socket Layer (SSL) or any other appropriate method.

After that the APP_ME 406 authenticates (416) itself to the NAF 402 using an appropriate authentication procedure. There exists several applicable authentication methods in the prior art that can be used. The authentication procedure may include one of the following:

- One time password hard-coded to the application. In this case it is preferable that the application's code is obfuscated so that it is very hard to retrieve password by simply examining the code.
- Username and password acquired out of band (like post or visits a shop).
- Registering to the NAF on-line to get the credentials.

Furthermore, the authentication method and securing the channel may be NAF specific. Shared key TLS may also be used in case of shared secrets. Also, HTTP-DIGEST authentication methods are well used for authentication.

Once the APP_ME 406 has been authenticated to the NAF 402, the NAF 402 will fetch (418) the NAF specific key KS_NAF from the BSF 400 using the BTID and derive (420) KS_NAF_install (similar to step 422). Then it transfers (424) KS_NAF_install to the APP_ME 406. That transfer should preferably be confidential.

Now, the APP_ME 406 may authenticate (426) itself to the GAA_ME_Server 408 using KS_NAF_install as a shared secret. If the authentication is successful the GAA_ME server 408 may add (428) the application into its trusted applications list depending on its local configuration. Therefore, step 428 may also be an optional step. If the application is in the trusted applications list, whenever in the future the APP_ME 406 makes a request for NAF keys, the GAA_ME server 408 bootstraps and provides the NAF keys without any additional authorization from the NAF 402.

In the embodiment disclosed in FIG. 4, the two install key derive boxes (420, 422) are placed in the same level. However, each one can be moved up or down depending on the requirement. The derivation of the install key may be done using e.g. hashing using KS_(ext)_NAF and the application instance identifier or just use KS_(ext)_NAF itself as KS_NAF_install.

The shared secret used to initially authenticate the APP_ME 406 and the NAF 402 may also be a one-time password. The password may be deleted at the NAF 402 once the terminal establishes trust with client's GAA_ME server 408. The shared secret may also be decided based on some mobile terminal characteristics. Furthermore, the authentication protocol between the APP_ME 406 and the NAF 402 itself may be any of the well-known authentication protocols. Once the authentication has been done, the method of securing the communication between AP_ME 406 and NAF 402 may be one of the well know methods. If a shared secret (e.g. username and password) is used, shared key TLS protocol is one alternative.

In one embodiment of the invention, when the GAA_ME server 408 has successfully authenticated the APP_ME 406, using a certain NAF id, the GAA_ME server 408 may grant the APP_ME access only to the future instances of key Ks_NAF that belong to same NAF id, and other NAF specific keys would not be accessible. In another embodiment of the invention, a full access is granted to the APP_ME 406, i.e., it can get KS_NAF keys of any NAF.

Furthermore, in one embodiment of the invention, during the procedure, multiple Ks_NAF keys may be used to grant access to multiple keys, i.e., the NAF 402 fetches multiple Ks_NAF keys from the BSF 400 (provided that it is authorized to do so), and the NAF 402 derives multiple Ks_NAF_install keys and sends them to the APP_ME 406. The APP_ME 406 may then register them with the GAA_ME server 408. This way the APP_ME 406 would gain access to more than one NAF specific key.

Figure 5:
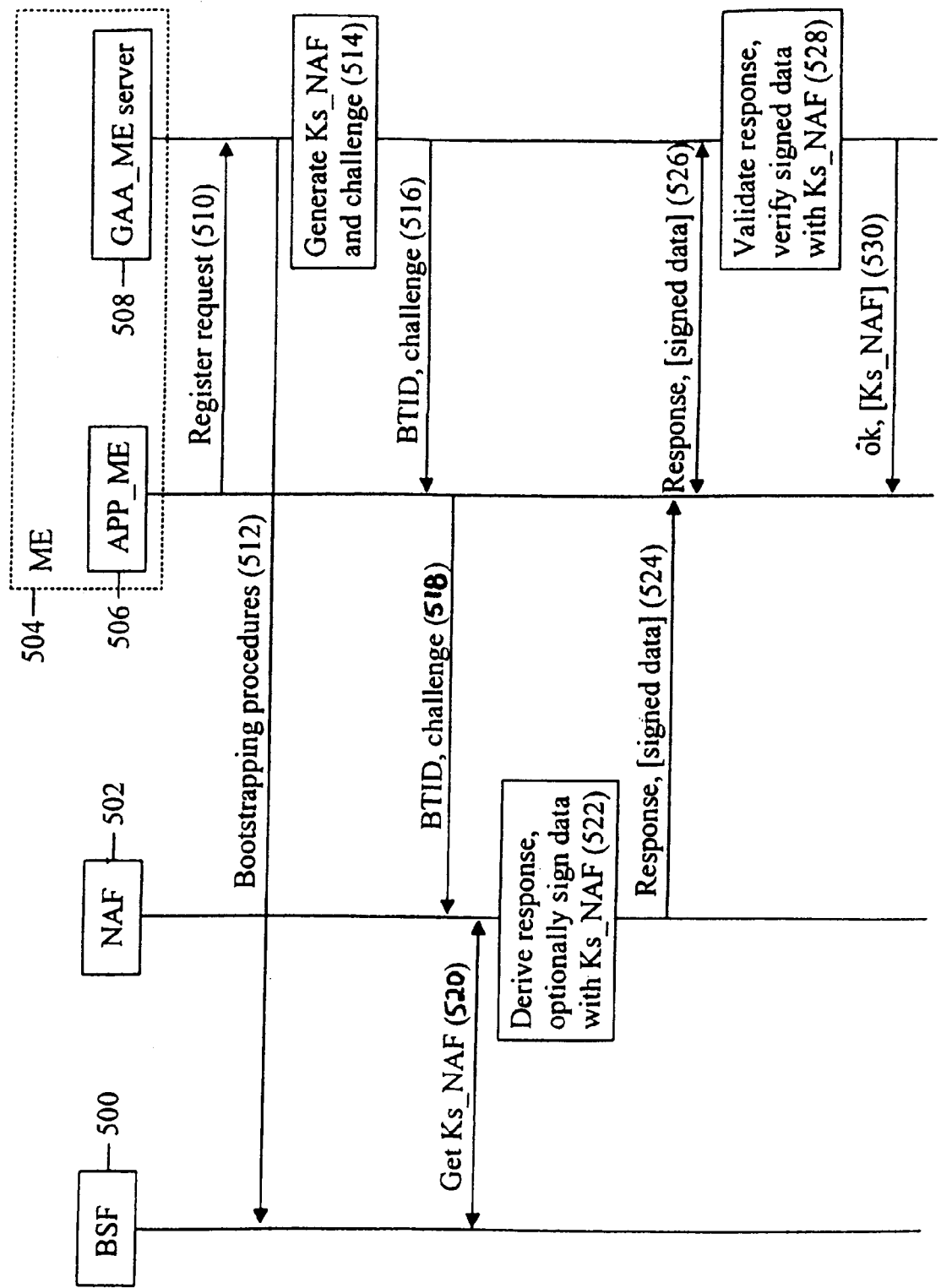
FIG. 5 is a signaling diagram illustrating another embodiment for authenticating an application towards a server application in mobile equipment in accordance with the present invention.

FIG. 5 is a signaling diagram illustrating another embodiment for registering and authorizing an application to a server application in mobile equipment in accordance with the present invention. FIG. 5 discloses three different entities: a Bootstrapping Server Function (BSF) server 500, a Network Application Function (NAF) server 502 and Mobile Equipment (ME) 504. Mobile equipment 504 includes a client application APP_ME 506 and a server application GAA_ME 508 already disclosed in FIG. 3. In another embodiment, the client application APP_ME may reside outside mobile equipment 504, that is, e.g. in an external device connected to mobile equipment 504.

In the embodiment of FIG. 5, the APP_ME 506 sends a registration request (510) to the GAA_ME server 508. The request indicates to the GAA_ME server 508 that the APP_ME wants to authorize itself to the GAA_ME 508 server. The request may also contain a NAF identifier and/or an application instance identifier. The application provider may have hard-coded the application or in it is some way configured to have the NAF identifier and the application instance identifier in place.

The GAA_ME server 508 carries out (512) a 3GPP bootstrapping protocol with the BSF 500. The bootstrapping protocol is disclosed in more detail e.g. in 3GPP technical specification 3GPP TS 33.220 V7.2.0 (2005-12). During the bootstrapping the GAA_ME server 508 receives at least a BTID (Bootstrapping Transaction Identifier) and the key lifetime from the BSF 500. Since the GAA_ME server 508 is able to derive key Ks and knows the NAF identifier, it is able to derive the key Ks_NAF (514) which is a shared secret between the GAA_ME server 508 and the NAF 502. The GAA_ME server 508 will also generate (514) a random challenge for the APP_ME (506). After this the GAA_ME server 508 passes (514) at least the BTID and the challenge to the APP_ME 506.

After receiving the BTID and the challenge from the GAA_ME server 508, the APP_ME 506 opens a communication link with the NAF 502, and passes (518) the B-TID, and the challenge to the NAF 502. The communication link may be secured to mitigate possible man-in-the-middle attacks.

The NAF 502 fetches (520) the NAF specific key KS_NAF from the BSF 400 using the BTID and derives (522) a response to the challenge by using Ks_NAF. The response may be calculated e.g. by using a one-way hash function or keyed-hash message authentication code (HMAC) where the input parameters include at least the Ks_NAF and the challenge. The NAF 502 may also sign data with the Ks_NAF. The data may include one or more hashes of applications that NAF 502 authorizes to have access to the NAF specific keys (Ks_NAFs). One of these hashes may be the hash of the APP_ME application (506) that has been installed in the ME (504) earlier. It should be noted that hash of the application is merely one possibility. Any other piece of information, that is, a suitable characterization of the application may be used instead of a hash. For instance, if the application resides in another device that is connected to the user's terminal over local network, such as WLAN or Bluetooth, then the characterization of the application may be the network address of the device. Also, one possible characterization of an application in an external device may be the serial number of that device. Moreover, one possible characterization would be a content signing public key. Furthermore, in one embodiment of the invention, the request (518) to the NAF 502 may include some characterization of the platform (e.g. "Nokia device running Series 60 v3.1") which then helps the NAF 502 to send back the correct acceptable characterization of the application. Then the NAF 502 (524) transfers the response and the possibly the signed data to the APP_ME 506.

The signed data refers e.g. to some extra data that the NAF 502 adds to the message, that is signed using by the Ks_NAF. This way the GAA_ME server can verify the signature of this extra data and be sure that it comes from a trusted source, which knows the Ks_NAF.

Now, the APP_ME 506 may authorize (526) itself to the GAA_ME_Server 508 by using the response and the signed data. If the authorization is successful, i.e., response, and signature of the signed data are correct, the GAA_ME server 508 continues with authorization procedure, and grants access to APP_ME 506 to the Ks_NAF. Additionally, the GAA_ME server 508 may also calculate the hash of the APP_ME 506, and check if this hash is in the signed data. If at least one of the checks above is successful the GAA_ME server 508 may add (528) the application into its trusted list depending on its local configuration. If the application is in the trusted list, whenever in the future the APP_ME 506 makes a request for NAF keys, the GAA_ME server 508 bootstraps and provides the NAF keys without any additional authorization from the NAF.

Possible adding the application into its trusted list gives the possibility have "one-time grants" and "full grants". In the first case the APP_ME would always have to get the extra authorization (response or signed data or both) for each request for Ks_NAF, or in the second case the APP_ME would get a permanent grant and would not have to get the extra authorization in the future requests for Ks_NAF.

Finally, if the verifications made above have been successful, the GAA_ME server 508 (530) indicates to the APP_ME that procedure was successful, and possibly includes Ks_NAF to this message.

In one embodiment of the invention, when the GAA_ME server 508 has successfully authenticated the APP_ME 506, the GAA_ME server 408 may grant access only to the specific NAF specific key Ks_NAF that was used during the procedure, and other NAF specific keys would not be accessible. Especially, this may be the case if signed data was not sent from the NAF 502 to the GAA_ME server 508 through APP_ME 506. In another embodiment of the invention, a full access is granted to the APP_ME 506, i.e., it can get all possible KS_NAF keys.

In another embodiment of the invention, the KS_(ext)_NAF is used as a group key, to secure a group communication and might be shared with other devices which might not have any form GBA key generation or requesting capability at all. This embodiment can be used to secure a communication link, for example in a home environment with many low-capability devices or to set-up a personal VPN (Virtual private network).

Furthermore, in one embodiment of the invention, NAF_ID can be sent to from the APP_ME 506 to the GAA_ME server 508 either in step 510 as described above or in step 526.

Furthermore, in one embodiment of the invention, during the procedure, multiple Ks_NAF keys may be used to grant access to multiple keys, i.e., the NAF 502 fetches multiple Ks_NAF keys from the BSF 500 (provided that it is authorized to do so), and the NAF 502 calculates multiple responses to the challenge using these Ks_NAF keys, and also optionally signs the data using all or subset of the Ks_NAF keys, and sends them to the APP_ME 506. The APP_ME 506 may then register them with the GAA_ME server 508. This way the APP_ME 506 would gain access to more than one NAF specific key.

Furthermore, this method can be applied in many other use cases, in which the terminal equipment is configured to trust a service provider (e.g. an equipment manufacturer, or by a network operator) and so the terminal equipment and the service provider either have, or can agree on, a shared key. We have described in detail how, if a new application can prove to the terminal that it is trusted by a said service provider then it can be marked "trusted" and installed on the user's terminal. That proof is based on knowledge of the key shared between the terminal and the service provider.

For instance, instead of application to be installed in the terminal, there could be a peripheral device or another terminal in a proximity network (e.g. Bluetooth, or WLAN network) that wants to connect to user's terminal. The procedure of trust establishment is the same also in those cases.

3GPP GBA is one of the ways to derive the shared key and establish trust between the terminal and the service provider. Other ways can be conceived as well. For instance, with public key infrastructure (PKI) in place, both parties would exchange certificates of their public keys, verify each other's signature and proceed to derive a shared key. Or, as another example, a long-term shared key can be preinstalled in the terminal by the network operator or the terminal manufacturer.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:
1. A method comprising:
performing, with a server application in mobile device equipment, bootstrapping procedures between the server application and a bootstrapping server function server;
deriving a shared key based on at least a key derived during the bootstrapping procedures;
providing a client application with a bootstrapping transaction identifier, wherein the bootstrapping transaction identifier is received from the bootstrapping server function server during the bootstrapping procedures and wherein the client application is capable of communicating with the mobile device equipment;
receiving, at the server application, a reply message from the client application; and
authenticating, at the server application, the client application by validating the reply message with the shared key, wherein authenticating the client application by validating the reply message with the shared key comprises verifying signed data included in the reply message from the client application, wherein the reply message is generated by the client application in response to receiving a challenge; and
wherein the at least the key derived during the bootstrapping procedures is a network application function specific shared secret key.
2. The method according to claim 1, wherein the authenticating of the client application comprises:
authenticating the client application by comparing the shared key with the response.
3. The method according to claim 1, further comprising:
providing the client application with the challenge, wherein the authenticating of the client application comprises authenticating the client application by validating the response with the challenge and the shared key.

4. The method according to claim 1, further comprising: receiving a register request from the client application, the request comprising an application instance identifier before providing the client application with the bootstrapping transaction identifier.

5. The method according to claim 4, wherein the deriving of the shared key comprises:
deriving the shared key based on the at least the key derived during the bootstrapping procedures, and the application instance identifier.

6. The method according to claim 1, further comprising: receiving a register request from the client application, before providing the client application with the bootstrapping transaction identifier.

7. The method according to claim 6, wherein the register request comprises an application instance identifier.

8. The method according to claim 1, further comprising: marking the client application as trusted if the authentication is successful.

9. The method according to claim 8, further comprising: providing the client application with the shared key.

10. The method according to claim 8, further comprising: receiving from the client application a request for a network application function key; and
sending to the client application the network application function key in response to the request.

11. A method comprising:
receiving, at a client application in a mobile device equipment seeking registration from a server application capable of communicating with the mobile device equipment, at least a bootstrapping transaction identifier and a challenge from a network application function server;
opening a communication link between the server application and the network application function server;
providing, by the server application, the network application function server with at least the bootstrapping transaction identifier via the communication link;
receiving, by the client application, in response to providing the bootstrapping transaction identifier, at least a response from the network application function server; and
authenticating the client application by providing the server application with at least a reply message based on a response received from the network application function server, wherein authenticating the client application comprises validating the reply message with a shared key and comprises verifying signed data included in the reply message from the client application, wherein the reply message is generated by the client application in response to receiving the challenge.

12. The method according to claim 11, wherein the receiving from the server application comprises receiving the bootstrapping transaction identifier and a challenge, and the providing to the network application function server comprises providing the network application function server with the bootstrapping transaction identifier and the challenge via the communication link.

13. The method according to claim 12, wherein the receiving from the network application function comprises receiving the response and signed data from the network application function; and the authenticating of the client application comprises providing the server application with the response and the signed data received from the network application function server.

14. The method according to claim 11, further comprising: receiving a shared key from the server application after successful authentication.

15. The method according to claim 11, further comprising: after authentication, sending to the server application a request for a network application function key; and receiving the network application function key from the server application in response to the request.

16. A method comprising:
opening a communication link between a server application capable of communicating with a mobile device equipment and a client application in the mobile device equipment;
receiving, from the client application, at least a bootstrapping transaction identifier via the communication link;
sending, by a network application function server, a request to a bootstrapping server function server to receive a shared key derived during bootstrapping procedures, the request comprising at least the bootstrapping transaction identifier;
receiving, at the network application function server, from the bootstrapping server function server, the shared key in response to the request;
in response to receiving a challenge at the client application, deriving a reply message, at the client application by using at least the shared key, wherein the reply message comprises signed data; and
sending at least the reply message to the server application;
wherein the shared key derived during the bootstrapping procedures is a network application function specific shared secret key;
wherein authenticating the client application by validating the reply message with the shared key comprises verifying the signed data included in the reply message from the client application.

17. The method according to claim 16, wherein:
the deriving of the response comprises deriving the reply message by using at least the shared key and the challenge.

18. The method according to claim 16, wherein:
the sending of at least the response comprises sending the response and signed data signed with the shared key to the client application.

19. A non-transitory computer-readable medium that stores a computer program that when executed by a data processing unit results in performance of operations comprising:
performing, with a server application capable of communicating with a mobile device equipment, bootstrapping procedures with a bootstrapping server function server;
deriving a shared key based on at least a key derived during the bootstrapping procedures;
providing a client application in the mobile device equipment with a bootstrapping transaction identifier, the bootstrapping transaction identifier being received from the bootstrapping server function server during the bootstrapping procedures;
receiving, at the server application, a reply message from the client application; and
authenticating, at the server application, the application by validating the reply message with the shared key, wherein authenticating the client application by validating the reply message with the shared key comprises verifying signed data included in the reply message from the client application, wherein the reply message is generated by the client application in response to receiving a challenge; and wherein the at least the key derived during the bootstrapping procedures is a network application function specific shared secret key.

20. The computer-readable medium according to claim 19, wherein the authenticating of the application comprises: authenticating the client application by comparing the shared key with the response.

21. The computer-readable medium according to claim 19, further comprising: providing the client application with the challenge, wherein the authenticating of the client application comprises authenticating the application by validating the response with the challenge and the shared key.

22. The computer-readable medium according to claim 19, further comprising: receiving a register request from the client application, the request comprising an application instance identifier before providing the client application with the bootstrapping transaction identifier.

23. The computer-readable medium according to claim 22, wherein the deriving of the shared key comprises: deriving the shared key based on the at least the key derived during the bootstrapping procedures and the application instance identifier.

24. The computer-readable medium according to claim 19, further comprising: receiving a register request from the client application, before providing the client application with the bootstrapping transaction identifier.

25. The computer-readable medium according to claim 24, wherein the register request comprises an application instance identifier.

26. The computer-readable medium according to claim 19, further comprising: marking the client application as trusted when the authentication is successful.

27. The computer-readable medium according to claim 26, further comprising: providing the client application with the shared key.

28. The computer-readable medium according to claim 26, further comprising: receiving from the client application a request for a network application function key; and sending to the client application the network application function key in response to the request.

29. A non-transitory computer-readable medium that stores a computer program that when executed by a data processing unit results in performance of operations comprising:
receiving, at a client application in a mobile device equipment seeking registration from a server application capable of communicating with the mobile device equipment, at least a bootstrapping transaction identifier and a challenge from a network application function server;
opening a communication link between the server application and the network application function server;
providing, by the server application, the network application function server with at least the bootstrapping transaction identifier via the communication link;
receiving, by the client application, in response to providing the bootstrapping transaction identifier, at least a response from the network application function server; and
authenticating the client application by providing the server application with at least a reply message based on a response received from the network application function server, wherein authenticating the client application comprises validating the reply message with a shared key and comprises verifying signed data included in the reply message from the client application, wherein the reply message is generated by the client application in response to receiving the challenge.

30. The computer-readable medium according to claim 29, wherein the receiving from the server application comprises receiving the bootstrapping transaction identifier and a challenge, and the providing to the network application function server comprises providing the network application function server with the bootstrapping transaction identifier and the challenge via the communication link.

31. The computer-readable medium according to claim 30, wherein the receiving from network application function comprises receiving the response and signed data from network application function, and the authenticating of the client application comprises providing the server application with the response and the signed data received from the network application function server.

32. The computer-readable medium according to claim 29, further comprising: receiving a shared key from the server application after successful authentication.

33. The computer-readable medium according to claim 29, further comprising: after authentication, sending to the server application a request for a network application function key; and receiving the network application function key from the server application in response to the request.

34. A non-transitory computer-readable medium that stores a computer program that when executed by a data processing unit results in performance of operations comprising:
opening a communication link between a server application capable of communicating with a mobile device equipment and a client application in the mobile device equipment;
receiving, from the client application, at least a bootstrapping transaction identifier via the communication link;
sending, by a network application function server, a request to a bootstrapping server function server to receive a shared key derived during bootstrapping procedures, the request comprising at least the bootstrapping transaction identifier;
receiving, at the network application function server, from the bootstrapping server function server, the shared key in response to the request;
in response to receiving a challenge at the client application, deriving a reply message, at the client application by using at least the shared key, wherein the reply message comprises signed data; and
wherein the shared key derived during the bootstrapping procedures is a network application function specific shared secret key;
wherein authenticating the client application by validating the reply message with the shared key comprises verifying the signed data included in the reply message from the client application.

35. The computer-readable medium according to claim 34, the deriving comprises deriving the response by using at least the shared key and the challenge.

36. The computer-readable medium according to claim 34, wherein: the sending of at least the response comprises sending the response and signed data signed with the shared key to the application.

37. An apparatus, comprising:

a data processing unit; and a memory including computer program code, where the memory and computer program code are configured to, with the data processing unit, cause the apparatus at least to, implement a server application capable of communicating with a mobile device equipment, wherein the server application is configured to perform bootstrapping procedures between the server application and a bootstrapping server function server, to derive a shared key based on at least a key derived during the bootstrapping procedures;

to provide a client application in the mobile device equipment with a bootstrapping transaction identifier, the bootstrapping transaction identifier being received from the bootstrapping server function server during the bootstrapping procedures, to receive, at the server application, a reply message from the client application, and to authenticate, at the server application, the client application by validating the reply message with the shared key, wherein authenticating the client application by validating the reply message with the shared key comprises verifying signed data included in the reply message from the client application, wherein the reply message is generated by the client application in response to receiving a challenge; and wherein the at least the key derived during the bootstrapping procedures is a network application function specific shared secret key.

38. The apparatus according to claim 37, wherein the server application is configured to authenticate the client application by comparing the shared key with the response.

39. The apparatus according to claim 37, wherein the server application is configured to generate a challenge, to provide the client application with the challenge, and to validate the response with the challenge and the shared key.

40. The apparatus according to claim 39, wherein the server application is configured to receive signed data with the response, and to verify the signed data with the shared key.

41. The apparatus according to claim 37, wherein the server application is configured to receive a register request from the application, the request comprising at least an application instance identifier before providing the client application with the bootstrapping transaction identifier.

42. The apparatus according to claim 41, wherein the server application is configured to derive the shared key based on the key derived during the bootstrapping procedures and the application instance identifier.

43. The apparatus according to claim 37, wherein the server application is configured to receive a register request from the client application, before providing the client application with the bootstrapping transaction identifier.

44. The apparatus according to claim 43, wherein the register request comprises an application instance identifier.

45. The apparatus according to claim 37, wherein the server application is configured to mark the client application as trusted when the authentication is successful.

46. The apparatus according to claim 45, wherein the server application is configured to provide the client application with the shared key.

47. The apparatus according to claim 45, wherein the server application is configured to receive from the client application a request for a network application function key, and to send to the client application the network application function key in response to the request.

* * * * *